2 Sheets—Sheet 1.

AULTMAN & MILLER.

Mower.

No. { 141, 1,244. }

Reissued Dec. 10, 1861

N. PETERS, PHOTO-LITHOGRAPHER, WASHINGTON, D. C.

AULTMAN & MILLER.
Mower.
No. { 141, 1,244. }
Reissued Dec. 10, 1861
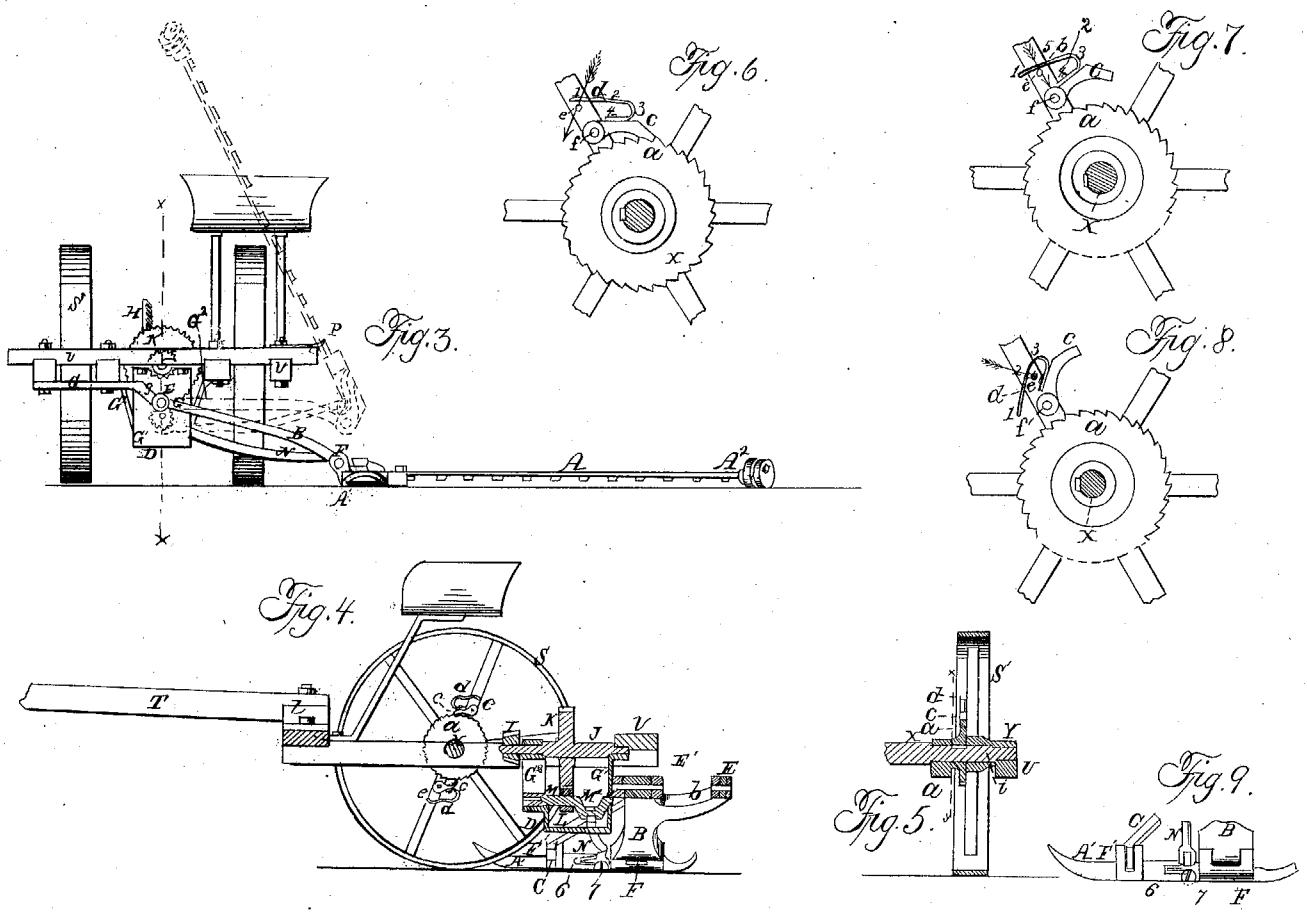
N. PETERS, PHOTO-LITHOGRAPHER, WASHINGTON, D. C.

UNITED STATES PATENT OFFICE.

C. AULTMAN AND L. MILLER, OF CANTON, OHIO, ASSIGNORS, BY MESNE ASSIGNMENTS, TO C. AULTMAN & CO.

IMPROVEMENT IN MOWING-MACHINES.

Specification forming part of Letters Patent No. 15,160, dated June 17, 1856; Reissue No. 755, dated July 19, 1859; Reissue No. 1,244, dated December 10, 1861.

*To all whom it may concern:*

Be it known that we, CORNELIUS AULTMAN and LEWIS MILLER, of Canton, in the county of Stark and State of Ohio, have invented certain new and useful Improvements in Mowing-Machines; and we do hereby declare the following to be a full, clear, and exact description of the same, reference being had to the accompanying drawings, making a part of this specification, in which—

Figure 1:
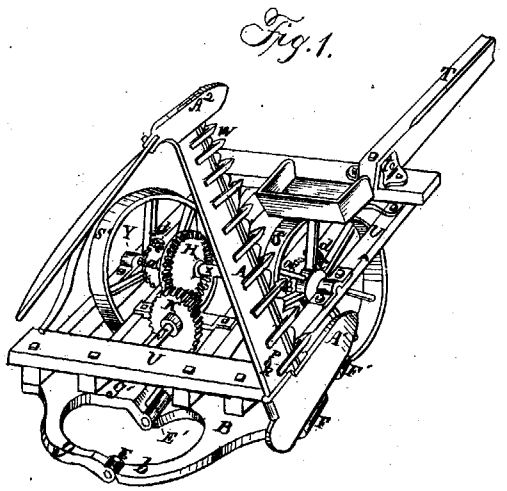
Figure 2:
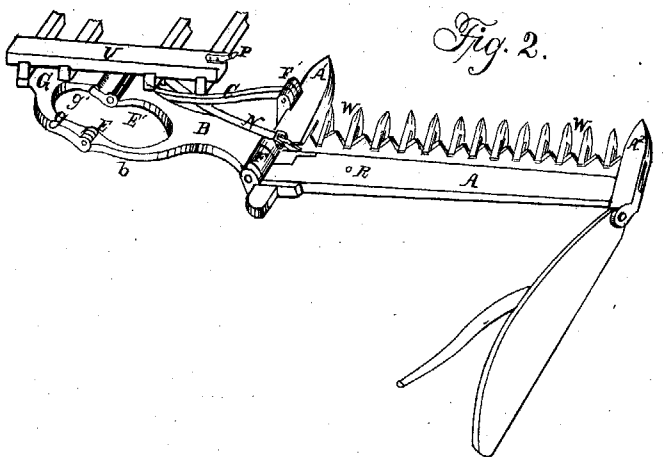

Figure 1 represents a perspective view of a mowing-machine which embraces our improvements, the finger-beam and cutter being raised on end and leaned against the side of the frame to adapt the machine to being drawn to or from the place of mowing. Fig. 2 represents a like view of the rear portion of the machine with the finger-beam extended upon the ground ready for mowing. Fig. 3 represents an elevation of the rear of the machine, showing particularly the relative positions of the parts when the finger-beam is down on the ground ready for work and when it is raised for transportation. Fig. 4 represents a section of the machine on the right of the line *x x* of Fig. 3. Fig. 5 represents an axial vertical section through one of the supporting-wheels, one of the ratchet-wheels, and that end of the axle on which these wheels are mounted, and a transverse section of these portions of the frame which are cut by the plane of the section through the wheel and axle. Fig. 6 represents a transverse section at the line X X of Fig. 5, and an elevation of the parts to the right of that line, except the frame and the rim and the outer ends of the spokes of the driving-wheel, showing particularly the relative position of the spring and pawl with the other parts when the pawl is in gear with the ratchet-teeth. Fig. 7 represents the same view of the parts shown in Fig. 6, but with the spring and pawl in a second and different position from the one shown in that figure. Fig. 8 represents the same view of the parts shown in Fig. 6, but with the spring and pawl in a third position different from those shown in Figs. 6 and 7; and Fig. 9 represents a side view of the inside shoe or divider, showing a stop by which the cutter or cutter-bar is prevented from dropping down when the finger-bar is turned up or leaned against the main frame.

The cutters of mowing-machines must be frequently removed to be sharpened and sometimes removed for repairs, and they are generally so made as to be drawn out from and slipped into the place where they work from the main frame end of the finger-bar; and, when a hinged or folding finger-bar is used and raised up on end, it is obvious that without some means of preventing it the cutters will drop through the slot in the intermediate shoe or support and hang or fall down upon the ground, not only endangering that end of the cutter, but making the folding up or leaning of the finger-bar against the main frame and the safe carrying of it there inconvenient and uncertain. With a view of remedying this defect we provide a stop which, while it in nowise interferes with the free vibration of the cutter in its supports, will, when the finger-bar is raised up or leaned up against the main frame to be carried there, prevent the cutter from dropping down into a position where it would be endangered by intervening obstacles in its path or interfere with the easy folding up of said finger-bar.

The accompanying drawings represent a mowing-machine in which the main frame U is supported on or by two larger wheels, S S′, said frame being furnished with a tongue, T, for the horses to draw by, and suitable gearing for giving motion to the cutter. The finger-beam A is connected to the main frame by an intermediate coupling-arm, B, hinged to the main frame by one of its ends and to a shoe, A′, at its other end, to which shoe the end of the finger-beam is attached.

The hinge F, by which the shoe is connected to the coupling-arm, is in such a position and so constructed as to admit of the outer end of the finger-beam being raised on end and leaned on the side of the frame in the position represented in Figs. 1 and 3, and there secured.

For the purpose of allowing the cutter V to be easily withdrawn and replaced for sharpening the blades or for repairs, a slot, 6, is made in the shoe A′, Fig. 9, through which it may be slid, the pitman N having been first disconnected from it; but when the finger-beam is raised up on end without some means to prevent it, the cutter would by its own weight drop out through this slot 6 and fall upon the ground, or hang down so low as to be damaged by striking against intervening obstacles, or cramp the finger-bar so that it would not freely turn up on its hinge. To remedy such a defect we place a stop, 7, in the line of motion of the finger-bar, but so that it will not interfere with the free vibration of the cutter when it is mowing. When, however, the finger-bar is turned up on its hinge, the cutter will slide down by its own weight until it comes against this stop, which may be close to the end of the vibration of the cutter, and it is securely held there against any further descent. For convenience, this stop 7 may be a button, which, when partially turned, will allow the cutter to be drawn out from or inserted in its bearings, and when partially turned in the other direction prevent its being moved only to a certain distance. By this simple contrivance the operator may raise up the finger-bar into a vertical position without its dropping out of its bearings.

What we claim under this patent is—

In combination with a hinged finger-bar and cutter, a stop which, when the finger-bar is raised up, will prevent the cutter from dropping out of its bearings, substantially as described.

CORNELIUS AULTMAN.
LEWIS MILLER.

Witnesses:
DANL. TONNER,
WM. BARBER.